Figure 1:
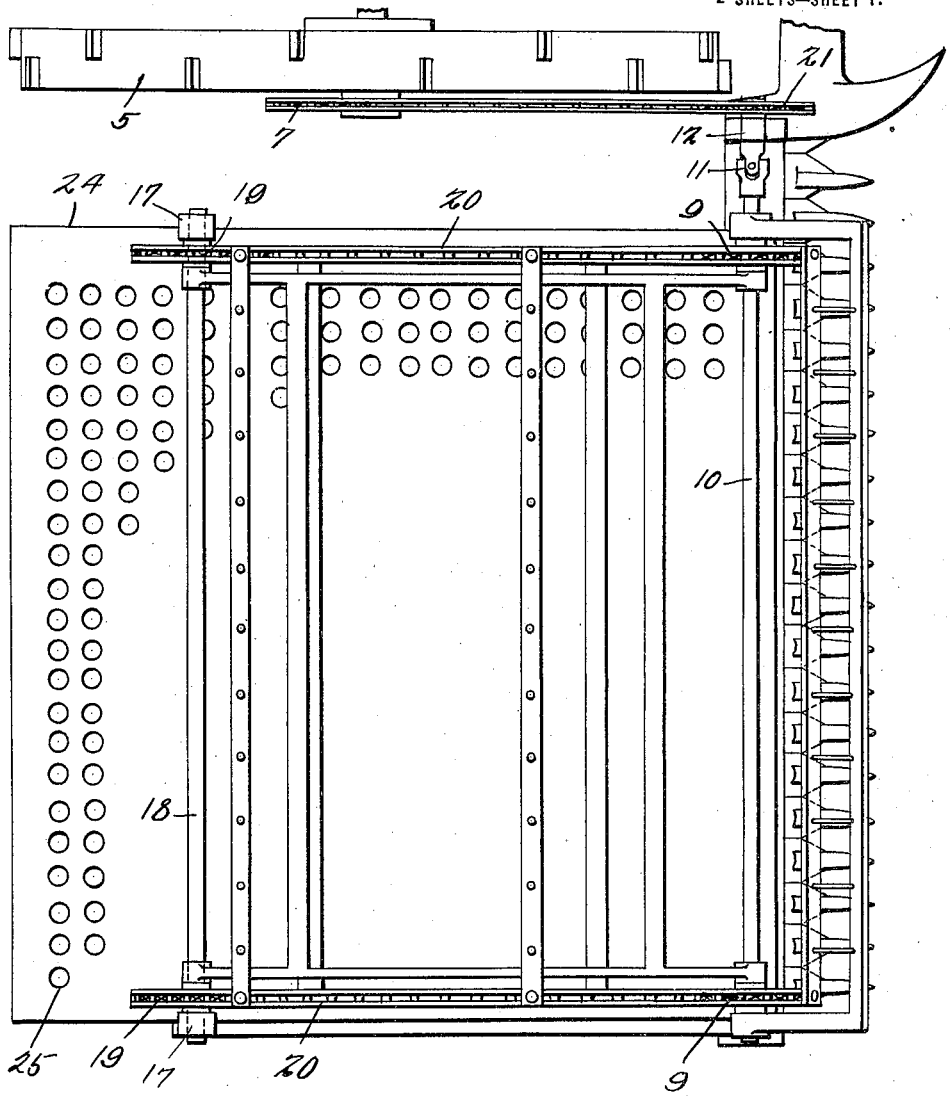

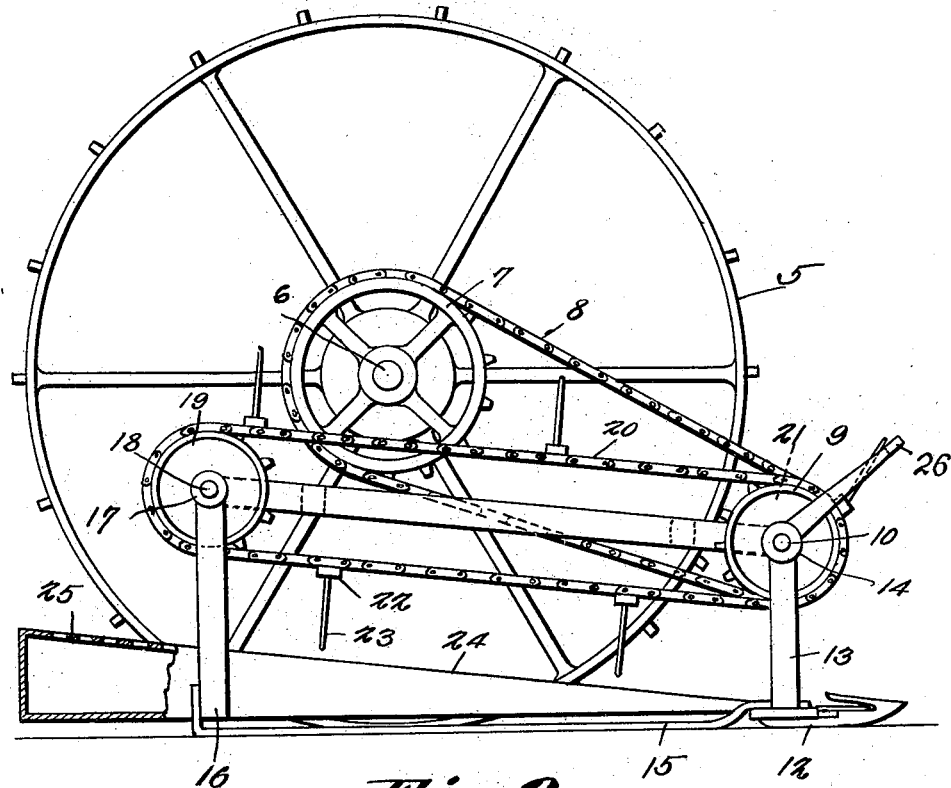

UNITED STATES PATENT OFFICE.

OSCAR T. PROVINE, OF BIG CREEK, MISSISSIPPI.

HARVESTER.

1,369,838.  Specification of Letters Patent.  Patented Mar. 1, 1921.

Application filed May 7, 1920. Serial No. 379,604.

*To all whom it may concern:*

Be it known that I, OSCAR T. PROVINE, a citizen of the United States of America, and resident of Big Creek, in the county of Calhoun and State of Mississippi, have invented certain new and useful Improvements in Harvesters, of which the following is a specification.

This invention relates to harvesters and particularly to seed gathering attachments for mowing machines or other devices employed for cutting grass, grain and the like, the said invention having for its object the provision of novel means for collecting the seed which is dislodged during the treatment of the vegetation whether it be grass or grain, and the said invention has for its further object the provision of an attachment operable in connection with sickle bars of harvesters so that vegetation cut by the sickle will fall to the collecting member and be carried rearwardly therefrom while at the same time it is agitated to cause a dislodgment of the seed.

Ordinarily the device would not be used except in connection with the cutting of grass or hay or the cutting of clover which is to be threshed for its seed or in connection with such other operation as has for its object the reclaiming of seed.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a top plan view of a fragment of the mowing machine with the invention applied thereto; and Fig. 2 illustrates a side elevation thereof.

In these drawings 5 denotes a traction wheel of a mower, provided with an extension 6 on which a driving wheel 7 is carried so that the driving wheel is rotated with the traction wheel. The driving wheel has a flexible member 8 run over it, which flexible member engages a driving wheel 9 on the shaft 10. In the present embodiment of the device, I have shown a sprocket wheel and chain arrangement for driving the shaft 10, but do not wish to be limited with respect to these details. Power is communicated to the shaft 10 through the medium of a universal joint 11 and the short shaft 12, on which the driven wheel 9 is mounted, this universal joint connection being for the purpose of permitting movement of the sickle bar 12 with relation to the driving member.

In order to apply the device to the sickle bar, I preferably provide standards 13, which are carried by the sickle bar and these standards terminate in bearings such as 14 in which the shaft 10 is journaled.

Runners such as 15 have their forward ends connected to the sickle bar 12 and they are adapted to slide on the ground, the rear ends of the said runners being connected to standards such as 16 which have their upper ends provided with bearings 17, in which a shaft 18 is journaled, the said shaft 18 having sprocket wheels 19 engaged by sprocket chains 20 running over the sprocket wheels 21 of the shaft 10. The sprocket chains have cross bars 22 connecting them, which cross bars have spurs or spikes 23 adapted to agitate the vegetation after it is cut and carry it rearwardly over the pan 24 which is supported at the front end by the sickle bar and at the rear end by the standards 16.

As shown in the drawing the pan 24 is tapered from the rear to the front and it has a perforated cover 25 which permits seeds to pass to the interior of the pan while the vegetation is carried over it. Any suitable means for gaining access to the interior of the pan may be provided for removing the deposits of seed and I do not wish to be limited with respect to such means as one skilled in the art will understand the operation, and it is believed unnecessary to further disclose it, although if such disclosure is found necessary the inventor would provide the rear wall with hinges and suitable fastenings whereby it or the top could be operated and closed after the manner of a hinged box cover.

In the operation of the device, it will be apparent that stalks of vegetation such as grass severed by the sickle would be engaged by the spurs 23 and agitated while being carried rearwardly over the pan, thus causing the seeds to be dislodged and to find their way to the interior of the pan through the apertures and this device will operate in conjunction with known harvesting or mowing machinery without unduly adding to the cost of the machine as compared with the advantages derived from the saving occasioned by the collection of the seed.

There is a frame 26 projecting upwardly and outwardly from the standards 13, one portion of which is in the path of travel of the spikes 23 which spikes are resilient and are temporarily arrested by the frame until the bar which carries the spikes has traveled beyond the frame after which the spikes have a spring action and strike the vegetation being cut to dislodge seed which may find its way into the pan.

I claim—

In a harvester having a cutter, supporting members connected to the cutter and extending rearwardly thereof, a pan having a perforated top carried by the supports, shafts journaled above the said pan, sprocket wheels carried by said shafts, sprocket chains connecting the sprocket wheels of one shaft with the sprocket wheels of the other shaft, cross bars connecting the chains, spikes carried by the cross bars and operable to carry cut stalks over the pan, means in the path of travel of the spikes for temporarily arresting them, and means for driving the said carrying device.

OSCAR T. PROVINE.